United States Patent
Smith (10) Patent No.: US 8,991,732 B2
(45) Date of Patent: Mar. 31, 2015

(54) CONVEYOR AND SPREADER

(76) Inventor: Wayne F. Smith, Palmyra, NY (US)

( * ) Notice: Subject to any disclaimer, the term of this patent is extended or adjusted under 35 U.S.C. 154(b) by 568 days.

(21) Appl. No.: 12/883,439

(22) Filed: Sep. 16, 2010

(65) Prior Publication Data

US 2012/0067985 A1   Mar. 22, 2012

(51) Int. Cl.
*A01C 19/00* (2006.01)
*E01C 19/20* (2006.01)
*B65G 31/02* (2006.01)

(52) U.S. Cl.
CPC .............. *E01C 19/203* (2013.01); *B65G 31/02* (2013.01); *E01C 2019/2075* (2013.01)
USPC .......................................... 239/672; 239/671

(58) Field of Classification Search
CPC ....... A01C 17/001; A01C 17/005; A01C 3/06
USPC .......... 239/672, 668, 677, 681, 663, 675, 676
See application file for complete search history.

(56) References Cited

U.S. PATENT DOCUMENTS

| | | | |
|---|---|---|---|
| 1,258,377 A | 3/1918 | Stuart | |
| 3,583,646 A * | 6/1971 | Bogenschutz | 239/666 |
| 4,478,369 A * | 10/1984 | Von Holten | 239/664 |
| 4,583,693 A | 4/1986 | Harder | |
| 5,927,617 A * | 7/1999 | Musso et al. | 239/657 |
| 6,012,656 A * | 1/2000 | Anderson | 239/672 |
| 6,149,079 A * | 11/2000 | Kinkead et al. | 239/668 |
| 6,508,419 B1 * | 1/2003 | Kinkead et al. | 239/668 |
| 6,698,997 B2 | 3/2004 | Arne et al. | |
| 2003/0080603 A1 * | 5/2003 | Connor | 298/24 |
| 2003/0156933 A1 | 8/2003 | Arne et al. | |
| 2005/0184174 A1 * | 8/2005 | Bailey et al. | 239/672 |

* cited by examiner

*Primary Examiner* — Davis Hwu

(57) ABSTRACT

A particulate material conveyor uses an endless loop that has a feed path arranged near a bottom of a load of material to be fed and a return path arranged above the feed path and within the load where the return path is protected by a cover. Material can flow under the cover onto the feed path without filling the return path under the cover. A spinner can be combined with a conveyor to form a spreader, and the conveyor and the spinner can be driven by a single motor through reduction drives. The spreader components are mounted on a sprocket drive shaft to pivot between deployed and stowed positions.

22 Claims, 6 Drawing Sheets

CONVEYOR AND SPREADER

TECHNICAL FIELD

Conveyors and spreaders feeding solid material.

BACKGROUND

Endless loop conveyors, usually provided with flight bars, feed material along a feed path and return along a lower return path. This has required some space under the feed path for the return path to work. A load to be conveyed then rests on the feed path, and the return path is made to run below the load. Spreaders can be arranged to receive the outflow from a loop conveyor, and can use a spinner to spread the material. This is often desirable for spreading particulate material on roadways. It is also desirable that spinners involved in spreading the material be movable between deployed positions and stowed positions, usually at the rear end of a truck.

SUMMARY

I have found ways of reducing the expense and increasing the efficiency and safety of loop conveyors and spreaders. My improvements in the conveyors have led to improvements in the spreaders, and vice versa. Not all conveyors output to a spreader, but many of them do. Also, not all spreaders are fed by conveyors, although many of them are. The improvements in conveyors can be used separately from the improvements in spreaders, and when the improved conveyors feed to the improved spreaders, the benefits increase.

For the conveyors, I have arranged a loop return path above the feed path. Material pulled along the feed path at the bottom of the load is delivered at the output end of the conveyor, where a sprocket drives the loop. The loop then turns upward around the drive sprocket to return along a path elevated above the feed path and positioned within the load. A cover arranged over the return path allows particulate material from the load to flow onto the feed path without filling the space under the cover so that the loop can return within the load space without being hindered by the load material. Any material tending to follow the loop along the return path drops back into the load to be subsequently reconveyed. Many arrangements of beams, channels, and support structures can allow load material to flow into the feed path while creating a protected recess within the load space for the return path of the loop.

I prefer that loop conveyors use only chains or a mesh web to convey material, without using flight bars welded to or extending between chains. Several advantages come from this. 1-3 chains, for example, or a narrow mesh web, can run along a relatively narrow feed path and still feed material at a desired rate if the chains or web move fast enough. Eliminating flight bars and speeding up the chain or mesh web movement has several advantages. The expense of welding flight bars to chains is eliminated, and higher speed movement for the chains or webs reduces the expense and power consumption of a reduction drive, enabling use of a drive motor that is electric.

The load resistance from the particulate material engaging surfaces of the feed loop on a narrow feed path is significantly less than the load resistance encountered by flight bars on a wider conveyor. This allows narrow loop conveyors to be moved with less power as well as a less expensive reduction drive. This also leads to a single electric motor driving the conveyor and a spinner of a spreader. This is especially advantageous for trucks that do not have hydraulic systems.

A drive system for a spreader using a narrow loop conveyor according to the invention can accomplish a first reduction between a preferably electric motor and a chain or belt drive to a spinner shaft. The spinner shaft can then drive a worm and worm wheel reduction with the worm wheel mounted on a shaft for the conveyor sprocket. The higher speed of the narrower feed path allows a smaller, less expensive, and less friction producing worm and worm wheel reduction for this purpose. This leads to an advantageous way of moving the spinner and motor between deployed and stowed positions. Since a worm wheel cannot drive a worm, and since the resistance of the feed movement to load material is reasonably small, a spinner and motor assembly of a spreader can be pivoted manually with the sprocket shaft between deployed and stowed positions. This necessarily moves the loop a few inches, but this is possible when load resistance is low. This also saves a separate pivot arrangement for moving a spinner between deployed and stowed positions.

This arrangement for a chain conveyor has many advantages. It reduces construction cost by about 20%; it eliminates the need for a clean-out space at the head end of the conveyor; it readily allows regulating the depth of the feed path and the positioning of a rock deflector upstream of a drive sprocket; and it is safer by better enclosing the moving parts.

Supporting or hanging the motor, drive train, and spinner on the sprocket shaft allows a convenient adjustment for loop slack. This was previously accomplished at an idler sprocket at the opposite end of the conveyor from the driving output sprocket. Slack adjustments applied to the shaft of the drive sprocket are more convenient and accessible. Also, the slack adjustment does not interfere with spreader operation, since all the spreader components are mounted on the sprocket shaft and move with the sprocket shaft to any adjusted position.

DETAILED DESCRIPTION

Conveyors for an embodiment of my invention preferably use a narrow loop that moves particulate material along a narrow feed path. This can be accomplished by 1-3 rows of chain links running parallel with each other in an endless loop. It can also be accomplished by a mesh web that is available in narrow widths and is sometimes used to convey fertilizer. Subject to cost variations and material differences, chain links as the conveying element and a mesh web as the conveying element are interchangeable. For illustrative purposes, chain links are used to show the preferred structures for my conveyors and spreaders, with the understanding that mesh webs can be substituted for chain links in endless conveyor loops.

Figure 1:
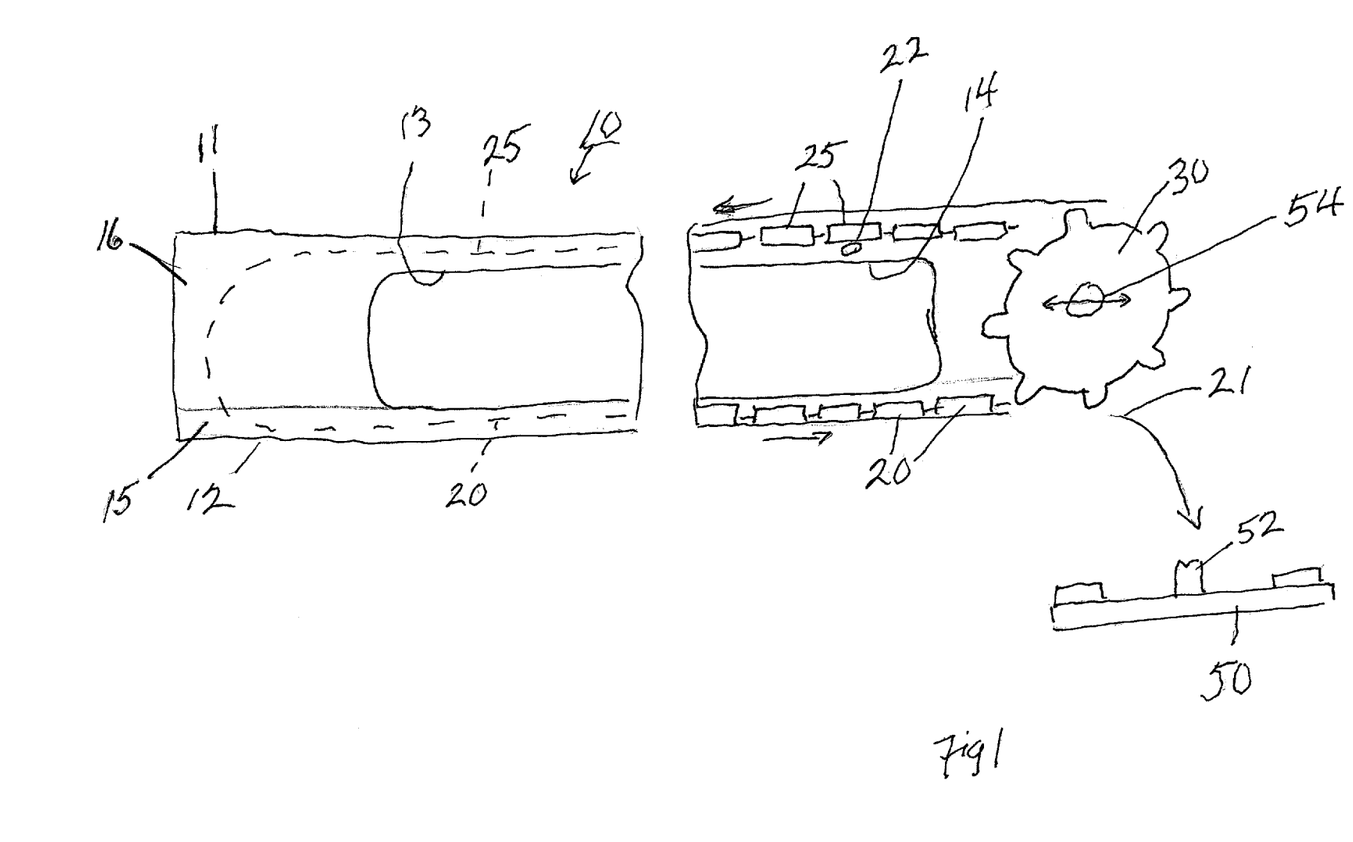
FIG. 1 is a schematic and partially cut-away elevational view of a preferred embodiment of the inventive conveyor.
Figure 5:
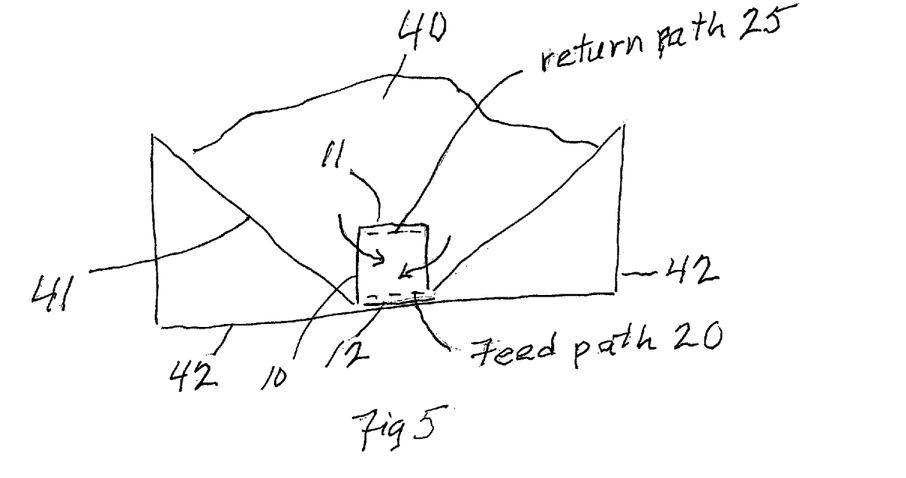
FIG. 5 is a schematic end view of the inventive conveyor positioned in the bottom of a hopper body in a truck bed.

FIG. 1 best illustrates conveyor 10 with its lower chain feed path 20, leading to an outflow drive sprocket 30, and an elevated chain return path 25. This arrangement can be structured in many ways to place conveyor 10 at the bottom of a load while chain return path 25 is superposed within the load. One preferred structure is illustrated in FIG. 5 where conveyor 10 is arranged at the bottom of a hopper body 41. Conveyor 10 can also be used in the flat bottom of a truck body. However arranged, return path 25 is sheltered by a cover of some sort to uphold the superposed load and keep a chain return path 25 free of hindrance from load material.

Figure 8:
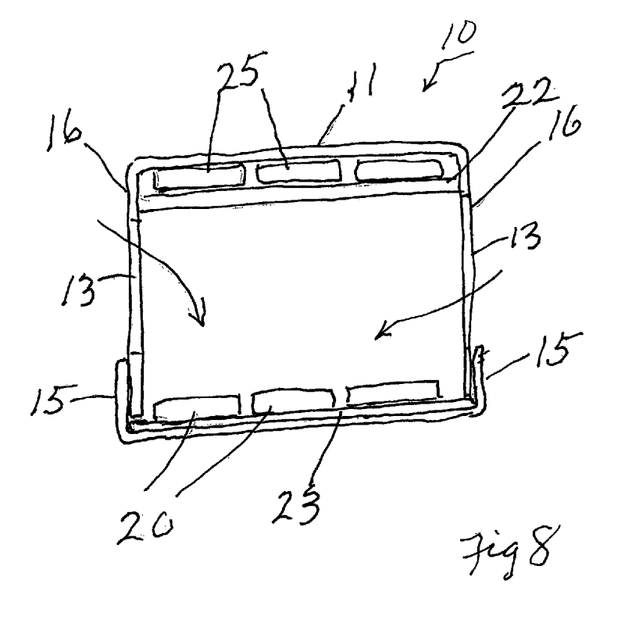
FIG. 8 is a schematic end view of conveyor 10 showing a preferred arrangement of channels establishing a feed path and a return path for chain links.

There are several ways that a workable structure for conveyor 10 can be made. I prefer a shallow channel 12 arranged to run along a longitudinal bottom of conveyor 10 and support the movement of one or more feed chains 20 toward an output at sprocket 30. Channel 12 has upturned side walls 15 as shown in FIGS. 1 and 8. A superposed cover 11 with downwardly extending side walls 16 nests within channel 12, as also illustrated in FIGS. 1 and 8. Channel 11 then forms cover protecting chain return path 25 from hindrance by load material. Openings 13 are cut in side wall 16 of cover 11 to allow material to flow in under return path 25 onto feed path 20. The top of cover 11 thus shelters return path 25 from load material, which does not entirely fill conveyor 10. Chain return guides 22 extend between side walls 16 of channel 11 underneath return chain path 25 to support chain links returning along the length of conveyor 10.

One advantage of the conveyor structure illustrated in FIG. 8 is that a low friction plastic sheet 23 can be arranged at the bottom of channel 12 where it is trapped by the lower edges of side walls 16 of channel 11. This occurs because side walls 16 are welded to side walls 15 of channel 12 in a position that leaves room to tuck sheet 23 underneath the bottom edges of side walls 16. This secures plastic sheet 23 from movement without requiring other fasteners or structures.

Many other arrangements for the structure of conveyor 10 are also possible. For example, cover 11 could be formed of a shallow channel similar to bottom channel 12 and could then be superposed over bottom channel 12 by vertically extending straps welded between channels 11 and 12. A box beam having a bottom 12 and a cover 11 with cut out side walls is another possibility. The alternative that I prefer of cutting windows or openings 13 and 14 in the side walls 16 of cover 11 is not wasteful, because the cut outs can be used for other components in a conveyor/spreader combination.

Chain feed path 20 can be made of one or more chains running in parallel. For smaller capacity conveyors and spreaders, I prefer a single chain or a mesh web of comparable width. This can be moved fast enough to supply material to a spinner. Single chain or narrow web conveyors can be suitable for pick-up truck mounted spreaders, for example. For larger pick-up trucks and small dump trucks, I prefer an intermediate size of a pair of chains moving alongside each other, or a narrow mesh web of comparable width. These arrangements can take advantage of a single drive by an electric motor, which is advantageous for trucks lacking hydraulic systems.

Figure 4:
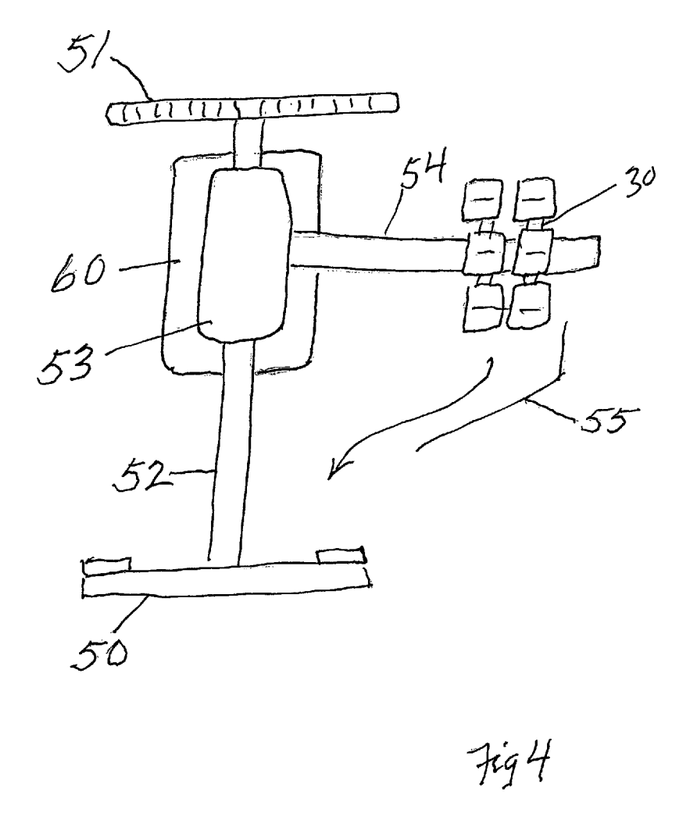
FIG. 4 is a schematic rear view of a discharge end of a conveyor leading to a spinner in a deployed position.
Figure 7:
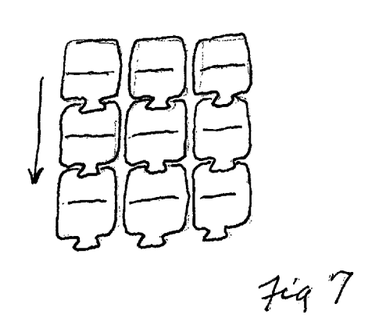
FIG. 7 is a schematic plan view of three chains running in parallel with each other.

For larger highway truck mounted spreaders, I prefer 3 adjacent chains or a comparable width of mesh web. Such trucks typically have hydraulic power, and can use conventional hydraulic motors for driving the conveyor and the spinner. A three-chain arrangement is shown in FIGS. 5, 7 and 8, and a two-chain arrangement is shown in FIG. 4. Sprocket 30 is a single or gang sprocket having sprocket teeth arranged to mesh with each of the number of chains used. Mesh webs of comparable width to the use of 1-3 chains are also sprocket driven.

A loop return guide 22 is preferably made of a low friction material to support the chain or web returning along path 25 underneath cover 11. Although load material is normally piled well above the cover 11 of conveyor 10, loop return 25 runs empty in the sheltered space below the cover 11. Load material 40, as shown by the arrows in FIGS. 3 and 8, passes through openings 13 and 14 to flow onto feed path 20. There, the material moves along with cavities in the links or web to output 21 in the region of drive sprocket 30.

Output 21 can deliver fed material to any convenient path or container. In the illustrated embodiment, output flow 21 is directed onto the top surface of spinner 50 which broadcasts the material in a swath such as used for treating snowy and icy roadways. A spinner spreader such as illustrated more completely in FIGS. 2-4 is a typical recipient of the outflow 21 from conveyor 10.

Figure 2:
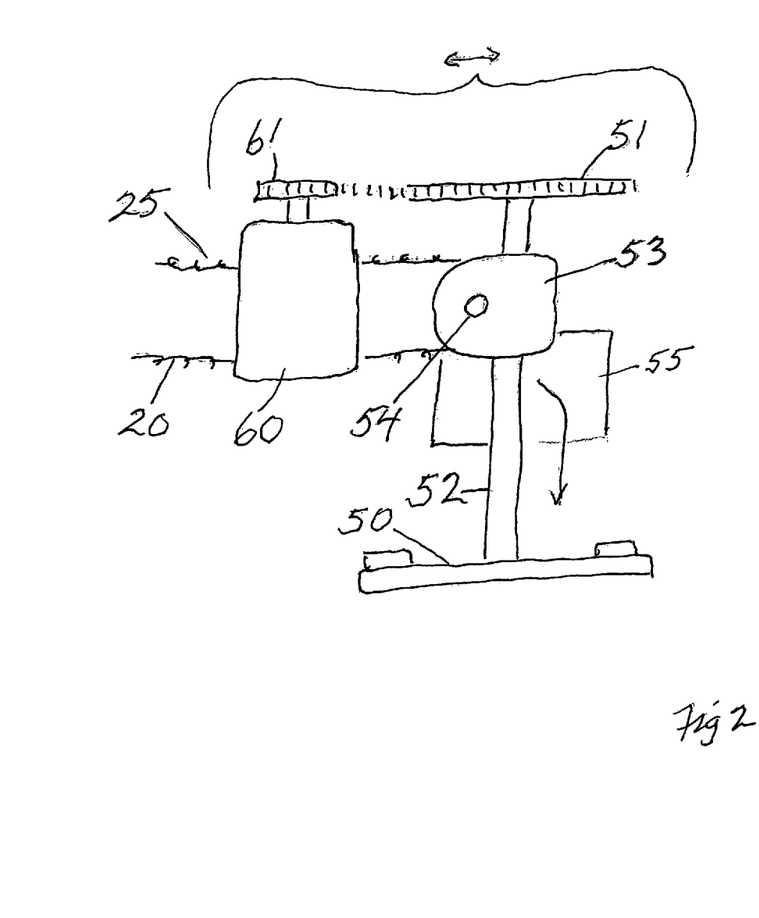
FIG. 2 is a schematic elevational view showing a spinner deployed at the discharge end of the conveyor.

In the deployed spreader position illustrated in FIG. 2, a motor 60 preferably drives a sprocket or pulley 61 belted or chained to a sprocket or pulley 51 driving a shaft 52 of spinner 50. The different sizes of drive element 61 and 51 cause a reduction from motor speed down to 500 to 600 rpm for spinner 50. Shaft 52 of spinner 50 drives a worm gear of a worm and worm wheel reduction 53, the worm wheel of which turns shaft 54 of sprocket 30. This provides a further and larger reduction to move the conveyor at a speed suitable for feeding load material to spinner 50. This arrangement allows motor 60 to be electrically powered, which is advantageous for trucks lacking hydraulic power.

Figure 3:
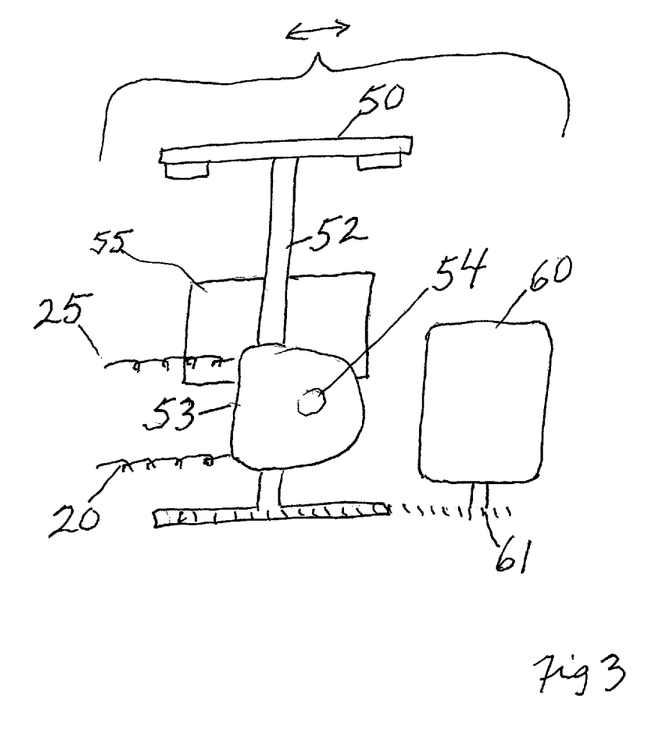
FIG. 3 is a schematic view showing the spinner, motor, and drive assembly of FIG. 2 pivoted to a stowed position.

FIG. 3 shows how spinner 50 and motor 60 can be pivoted to a stowed position that elevates spinner 50. This rotation occurs on the axis of sprocket shaft 54 (while motor 60 is not rotating) so that no separate pivot axis need be established. The movement between the deployed position illustrated in FIG. 2 and the stowed position illustrated in FIG. 3 necessarily rotates sprocket 30 and moves the conveyor at least a few inches, but this is manually possible, even under load resistance, with the leverage afforded by shaft 52 and the light load resistance offered by the chain links or web.

Enabling the preferred pivoting of spreader components between deployed and stowed positions preferably locates the spreader components to one side of the output flow of material from conveyor 10, as shown in FIG. 4. A deflector or guide 55 directs output flow 21 downward onto spinner 50 in a position where spinner 50 and the other spreader components are free to pivot on sprocket shaft 54 while staying clear of sprocket 30. Since all the spreader components are preferably hung or mounted on sprocket shaft 54, they can all pivot together between the positions of FIGS. 2 and 3 without requiring any separate pivot. Guide 55 facilitates this by allowing the spreader components to be disposed alongside the output of the chain conveyor. Many other arrangements are possible, however.

Chain and mesh web conveyors require a slack adjustment as the loop wears, and this was ordinarily accomplished in the prior art by an adjustment at an idler end of a conveyor. This has several disadvantages, including not being easily accessible. As schematically shown in FIGS. 1-3, slack adjustment for conveyor drive shaft 54 is accomplished at the output end where drive sprocket 30 operates. This region is more accessible, and the lateral adjustment indicated by double-headed arrows in FIGS. 1-3 can move not only shaft 54, but all the spreader components mounted on or supported by shaft 54. These include motor 60, drive elements 61 and 51, reduction gear 53, guide 55, spinner shaft 52, and spinner 50. Since loop slack adjustments only require an inch or two of movement, the spreader components are not adversely affected by any adjustment that is required. This slack adjustment can also be used when separate hydraulic motors drive the conveyor and the spinner.

Figure 6:
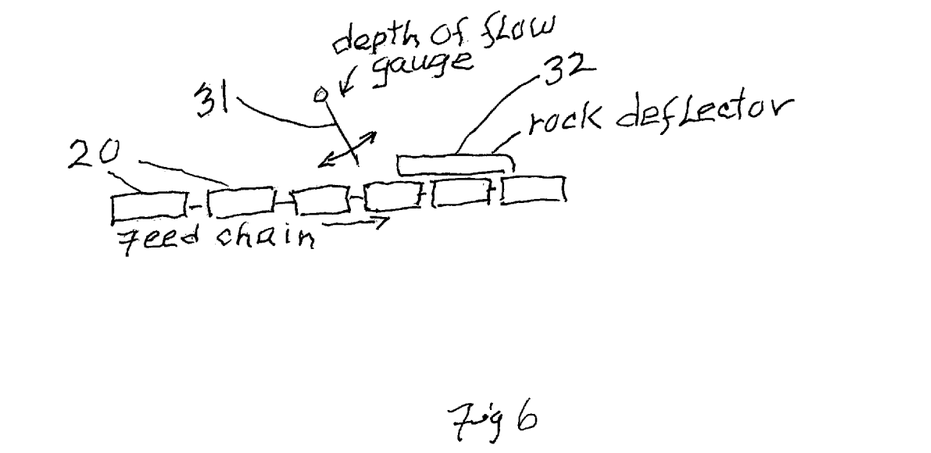
FIG. 6 is a partially schematic view of a feed chain combined with a depth of flow gauge and a rock deflector.

The feed rate of conveyor 10 is preferably adjustable with a depth flow gauge 31, as shown in FIG. 6. Gauge 31 is angularly adjustable to admit outflow only for material passing below the lower edge of gauge 31. Also shown in FIG. 6 is rock deflector 32 that can divert a rock off the side of the conveyor chains so that a rock does not reach sprocket 30, where it might cause damage.

The arrangement schematically illustrated in the drawings offers many advantages in economy, efficiency, and safety. For example, previous flight bar conveyors with a return path below a feed path were made with an access opening at the head end of the conveyor where the return path turns up to become the feed path. This was because material incidentally carried by the return path could accumulate and require cleaning out. Such an opening takes up space that could otherwise be devoted to the load and to the conveyor; and an exposed clean-out also affords a dangerous possibility for accidents as people reach in to clear material from the head end of the conveyor. In contrast, the return chain path that is elevated above the feed path and housed underneath cover 11 within a load, as shown in the drawings, keeps the conveyor's moving parts out of reach and therefore safer under most circumstances.

A chain or mesh web conveyor having a width of only a few chains has a much smaller surface area exposed to load resistance so that a narrow loop conveyor lacking flight bars has much less load resistance than a wider flight bar conveyor. This requires much less power to start the loop moving and keep it moving, and the smaller power requirement leads to significant savings. Wide flight bar conveyors can sometimes require powerful hydraulic motors, whereas a narrow conveyor having an elevated return path can be operated by a small electric motor 60 supplying much less power. Such a motor can drive a spinner if necessary, and can also drive the conveyor with a smaller reduction gear. A larger reduction adds to the friction and the expense of a reduction gear drive, so that a smaller motor and a smaller reduction drive system contribute to lower cost and less power consumption.

Conveyors made according to the described embodiment can be assembled and inventoried so that they are ready to add to truck bodies or hopper bodies as orders arrive. All it takes to assemble a conveyor of an appropriate length is to slide it into the truck or hopper body and bolt it in place.

The described arrangements lead to more efficient hopper bodies, as shown schematically in FIG. 5, where the return path 25 is in the load material 40, rather than under the hopper body 41. It is not necessary to leave an empty return path below the bottom of the hopper body so that the hopper body 41 can be made more capacious for the same size truck 42 when the return path occupies space in the load, rather than underneath the load.

Conveyors made of chain links only are more versatile than flight bar conveyors or auger conveyors in handling a variety of materials. Available chains are very successful at this, and I prefer a number 662 exposed pin pintle chain whose links are ¾" high. A larger 667 chain with links 1" high is also possible. Such chains are schematically illustrated in FIG. 5. Conveyors using endless loops of mesh web of comparable width to the preferred narrow chain paths also offer many of the same advantages.

Another advantage of a chain or mesh web conveyor is smooth and even flow of load material. This contrasts with flight bar conveyors that deliver more of the load right ahead of the flight bar and less of the load right behind the flight bar, for a pulsating effect. A smooth flow has advantages for several purposes, including use with a spinner 50.

What is claimed is:

1. A particulate material conveyor having a cover and using an endless loop of a chain or a mesh web moving material along a feed path near a bottom of a load of the material to be fed, the conveyor comprising:
    a return path arranged in a space within the load above the feed path and underneath the cover;
    the cover extending for the length of the conveyor and being arranged within the load above the return path; and
    the cover being arranged to allow the material from the load to flow onto the feed path below the cover without filling the space immediately under the cover through which the loop can move along the return path without hindrance from the material, wherein the conveyor includes a return path loop support that is positioned underneath the loop and contacts an underside surface of the loop at a plurality of positions along the loop's length as the loop moves along the return path under the cover.

2. The conveyor of claim 1 wherein the cover is a channel oriented with downturned sides, the return path is arranged within the downturned sides, and openings in the sides below the return path allow the material to flow onto the feed path.

3. The conveyor of claim 1 combined with a spinner to spread the material and a motor with a reduction drive system arranged for rotating the spinner and driving the loop.

4. The conveyor of claim 3 wherein the spinner and motor pivot with a drive shaft of a loop sprocket between deployed and stowed positions.

5. The conveyor of claim 1 including a spinner/spreader assembly having a motor, a reduction drive to turn the spinner, and a reduction drive from a shaft of the spinner to a shaft of a sprocket driving the loop, and the spinner assembly is rotatable with the sprocket shaft to move between a deployed position and a stowed position.

6. The conveyor of claim 1 wherein a base for the conveyor is a channel with upwardly extending sides, the cover is a channel with sides extending downward to the base, and openings are formed in the cover channel below the loop return path and above the feed path to allow flow of the load material onto the feed path.

7. An endless loop conveyor having a cover and arranged near a bottom of a load of particulate material, a chain or mesh web arranged for feeding the material along a feed path toward an output, the conveyor comprising:
    the cover arranged above the feed path in a space within the load, the cover extending for a length of the conveyor;
    a return path for the loop being arranged above the feed path and closely underneath the cover; and
    the cover being arranged to form a material-free space underneath the cover allowing the chain or mesh web to move along the return path within the space without resistance from material on the feed path, wherein the conveyor includes a return path loop support that is positioned underneath the loop and contacts an underside surface of the loop at a plurality of positions along the loop's length as the loop moves along the return path under the cover.

8. The conveyor of claim 7 having downturned sides with openings allowing material from the load to flow onto the feed path.

9. The conveyor of claim 7 wherein an electric motor moves the loop via a reduction drive.

10. The conveyor of claim 9 wherein the motor also drives a spinner for spreading an output of the conveyor.

11. The conveyor of claim 10 wherein the motor, the spinner, and the reduction drive are pivotable with a drive shaft of the sprocket between a deployed position and a stowed position.

12. A particulate material conveyor having a cover and comprising:
   a base formed as a channel with upwardly oriented sides;
   a chain or mesh web loop running along a feed path within the base channel near a bottom of a load of the particulate material;
   the cover formed as a top channel having downwardly oriented sides arranged above the base channel to span a width of the base;
   the cover having side openings allowing the material from the load to flow onto the feed path;
   the cover extending for a length of the conveyor; and
   a return path of the loop being arranged above the feed path and closely underneath the cover where the return loop does not encounter resistance from the load material.

13. The conveyor of claim 12 including supports arranged in the cover underneath the return path to support the loop in the return path.

14. The conveyor of claim 12 including a gang sprocket driven by a worm and worm wheel reduction drive to move the loop.

15. The conveyor of claim 14 including a motor driving the worm and worm wheel reduction via a shaft of a spinner arranged to spread the output from the conveyor.

16. The conveyor of claim 14 wherein the motor and the spinner are pivotal with a drive shaft of the sprocket between deployed and stowed positions.

17. The conveyor of claim 16 wherein a shaft of the sprocket is adjustable to take up loop slack.

18. A spreader of particulate material using a conveyor feeding the material from a load and a spinner receiving and spreading material output from the conveyor, the spreader comprising:
   the conveyor using an endless loop of a chain or a mesh web having a feed path disposed within a channel with upwardly oriented sides and arranged at a bottom of the load of the material and having a sprocket driving the loop at an output region;
   a loop return path arranged in a space within the load above the feed path;
   a cover arranged within the load above the feed path and the return path where the cover reduces intrusion of the material into the loop return path;
   the cover having downturned sides formed to allow material from the load to flow onto the feed path without filling a space immediately under the cover through which the loop can move along the return path free of hindrance from material;
   a first reduction drive to rotate the spinner and a second reduction drive to rotate a sprocket of the conveyor; and
   the spinner being pivotable around a drive shaft of the sprocket to move between a deployed and a stowed position when the reduction drives are not turning.

19. The spreader of claim 18 including supports arranged under the cover to support the loop on the return path.

20. The spreader of claim 18 wherein the cover is a channel having downturned sides with openings allowing material to flow from the load onto the feed path.

21. The spreader of claim 18 wherein the motor, spinner, and reduction drives are mounted on and supported by the sprocket shaft.

22. The spreader of claim 21 wherein the sprocket shaft and elements supported by the sprocket shaft are adjustable to take up loop slack.

* * * * *